(12) United States Patent
Jodorkovsky et al.

(10) Patent No.: US 7,492,685 B2
(45) Date of Patent: Feb. 17, 2009

(54) TECHNIQUES FOR DETECTING A TYPE OF OPTICAL MEDIA AND OPERATING A MEDIA MACHINE IN RESPONSE

(75) Inventors: Mario Jodorkovsky, Nesher (IL); Nir Zonshine, Zichron-Yaakov (IL)

(73) Assignee: Zoran Corporation, Sunnyvale, CA (US)

( * ) Notice: Subject to any disclaimer, the term of this patent is extended or adjusted under 35 U.S.C. 154(b) by 581 days.

(21) Appl. No.: 11/040,289

(22) Filed: Jan. 20, 2005

(65) Prior Publication Data
US 2006/0158987 A1    Jul. 20, 2006

(51) Int. Cl.
G11B 7/00    (2006.01)
(52) U.S. Cl. ................. 369/53.22; 369/53.23
(58) Field of Classification Search ........... None
See application file for complete search history.

(56) References Cited

U.S. PATENT DOCUMENTS

| | | | |
|---|---|---|---|
| 5,745,461 A | 4/1998 | Kawasaki | |
| 5,757,742 A | 5/1998 | Akiba et al. | |
| 5,764,610 A | 6/1998 | Yoshida et al. | |
| 5,808,993 A * | 9/1998 | Lee | 369/53.23 |
| 5,959,280 A | 9/1999 | Kamatani | |
| 6,295,260 B1 * | 9/2001 | Shihara et al. | 369/53.2 |
| 2002/0136110 A1 | 9/2002 | Watt et al. | |
| 2002/0159363 A1 * | 10/2002 | Takeuchi | 369/53.23 |
| 2004/0105370 A1 | 6/2004 | Hsu et al. | |

OTHER PUBLICATIONS

European Patent Office/International Searching Authority, "Notification of Transmittal of the International Search Report and the Written Opinion of the International Searching Authority, or the Declaration," mailed in corresponding International Application No. PCT/US2006/000599 on May 4, 2006, 12 pages.

* cited by examiner

*Primary Examiner*—Joseph Feild
*Assistant Examiner*—Joseph Haley
(74) *Attorney, Agent, or Firm*—Davis Wright Tremaine LLP

(57) ABSTRACT

An optical disc machine initially identifies a disc positioned in it by moving the focal point of its optical pick-up unit between an outer surface and an interior reflective data carrying surface. The time required for the focal point to travel between the two reflective layers, proportional to the distance between the layers, is compared with one or more thresholds to identify the type of disc present. Example types are CDs and DVDs that can be distinguished from each other because of different distances between their two layers. Variations in the velocity of a motive source that drive the focal point to traverse the disc are compensated in order to avoid erroneous measurements of the distance between reflective layers, and thus to avoid misidentifying the disc types. Different types of DVDs or CDs may also be identified by measurement of reflected light intensity with respect to a threshold that is updateable.

11 Claims, 5 Drawing Sheets

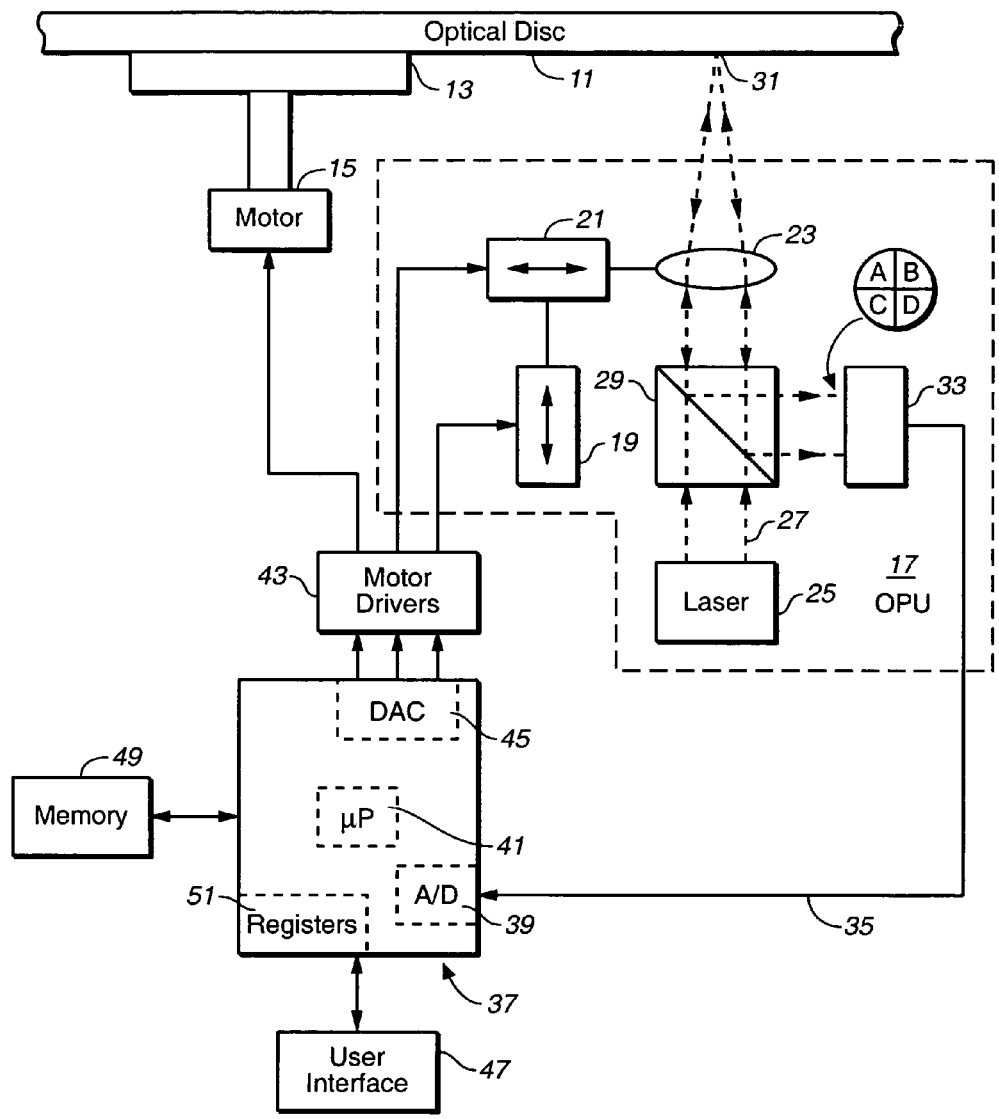
FIG._1

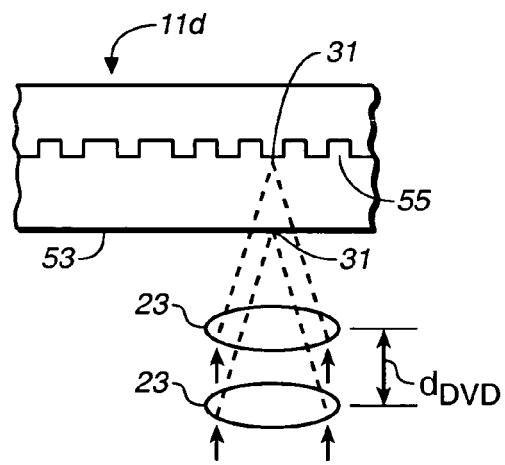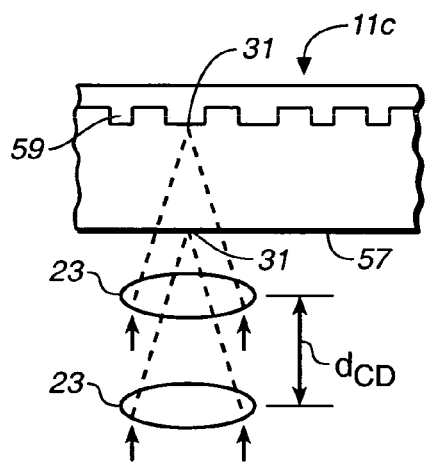
FIG._2  FIG._3
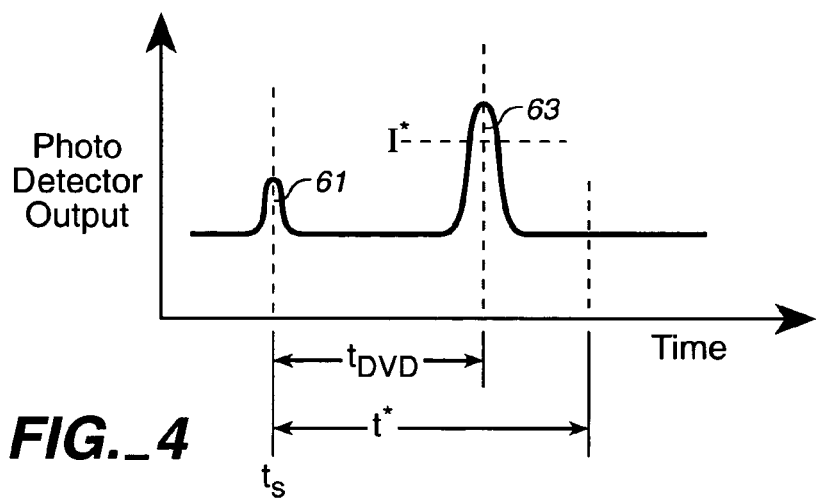
FIG._4
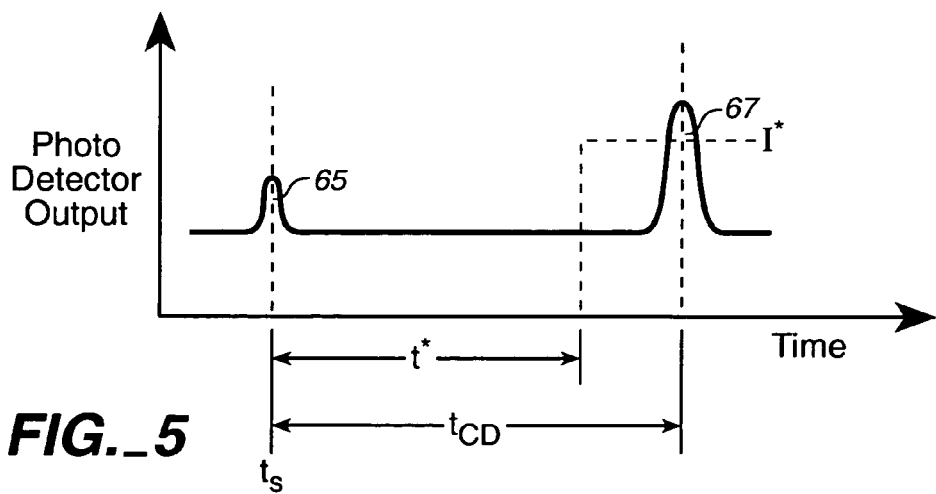
FIG._5

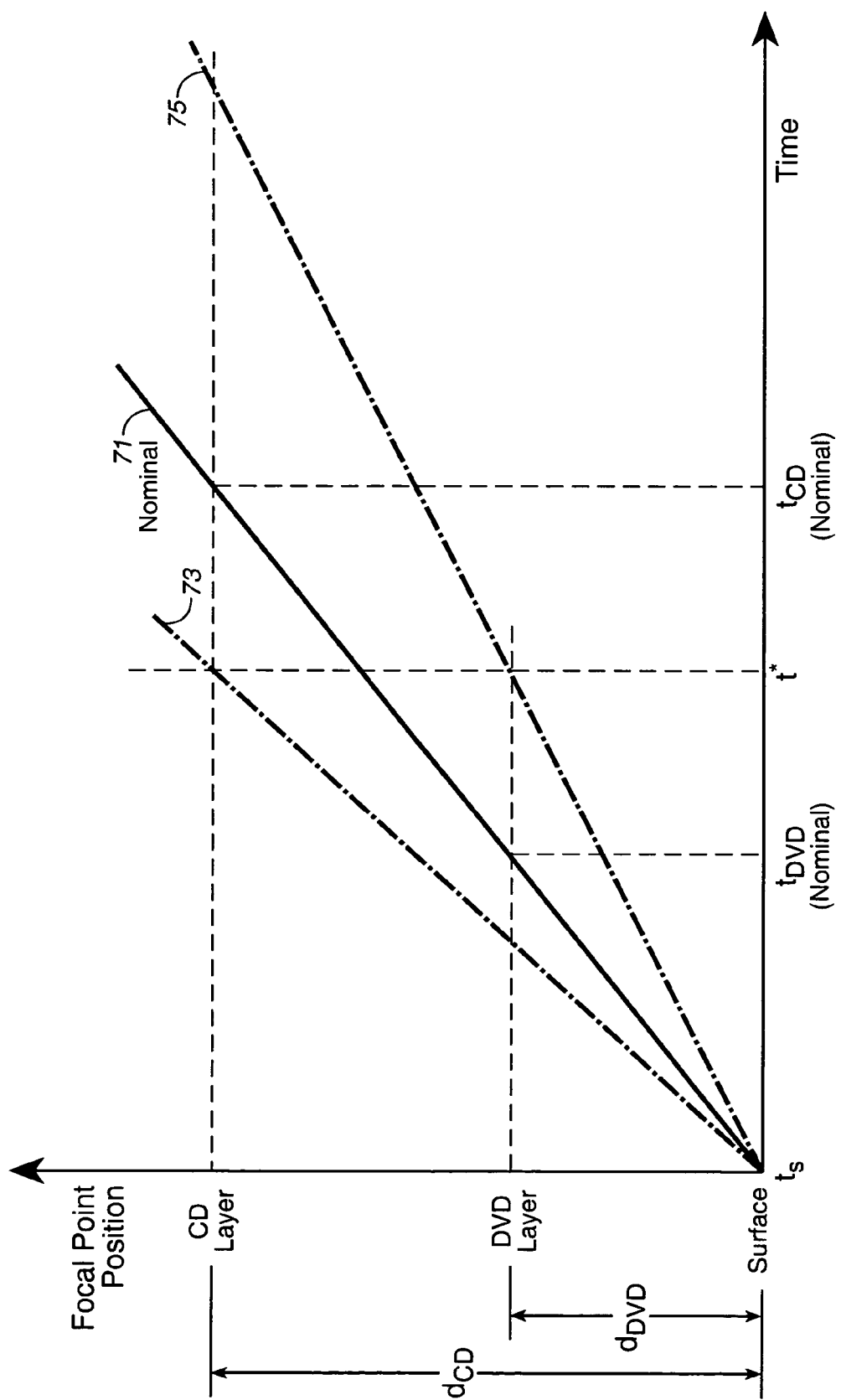
FIG._6

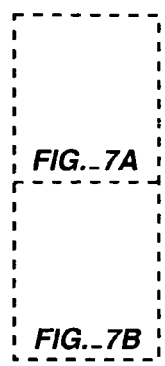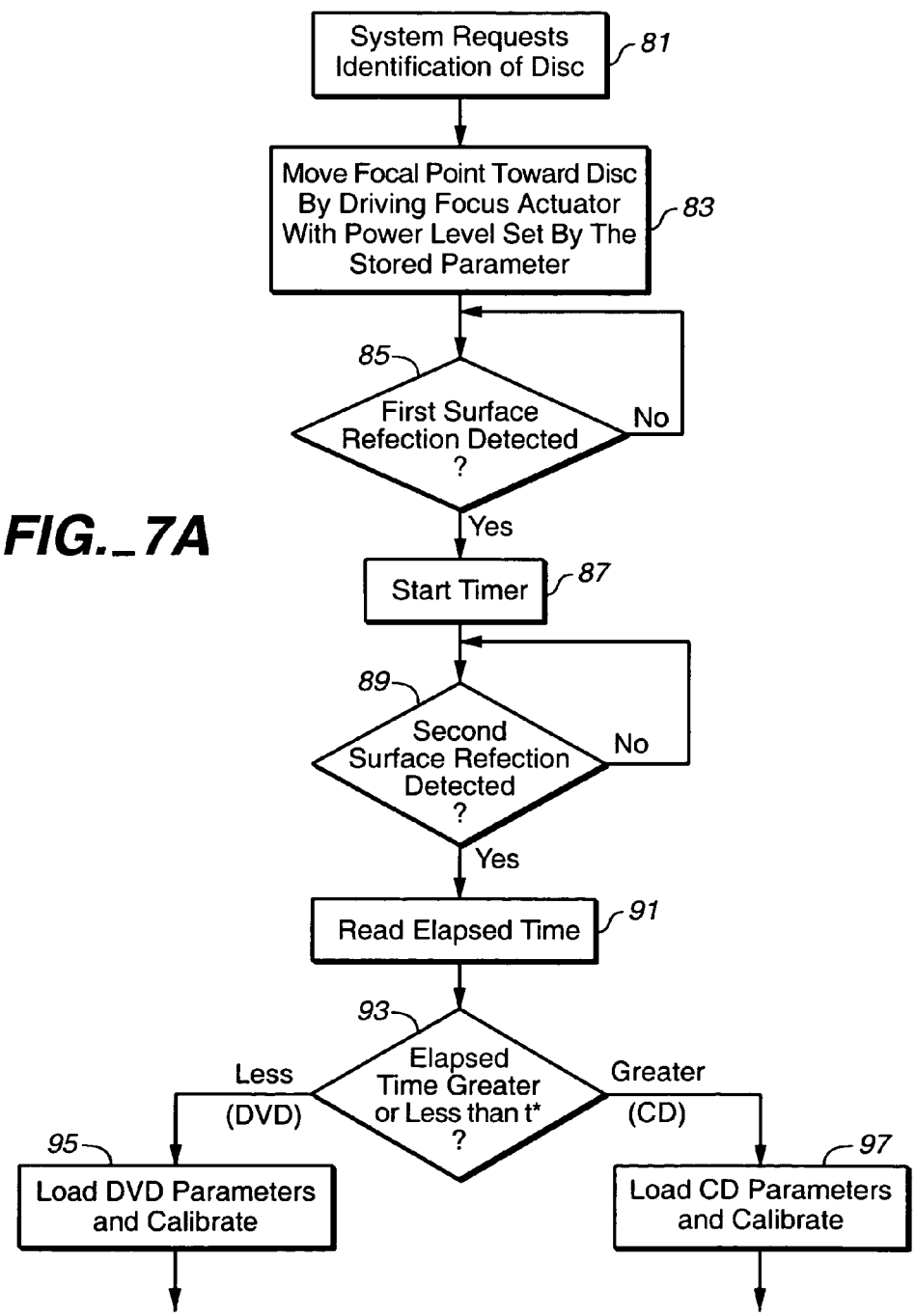

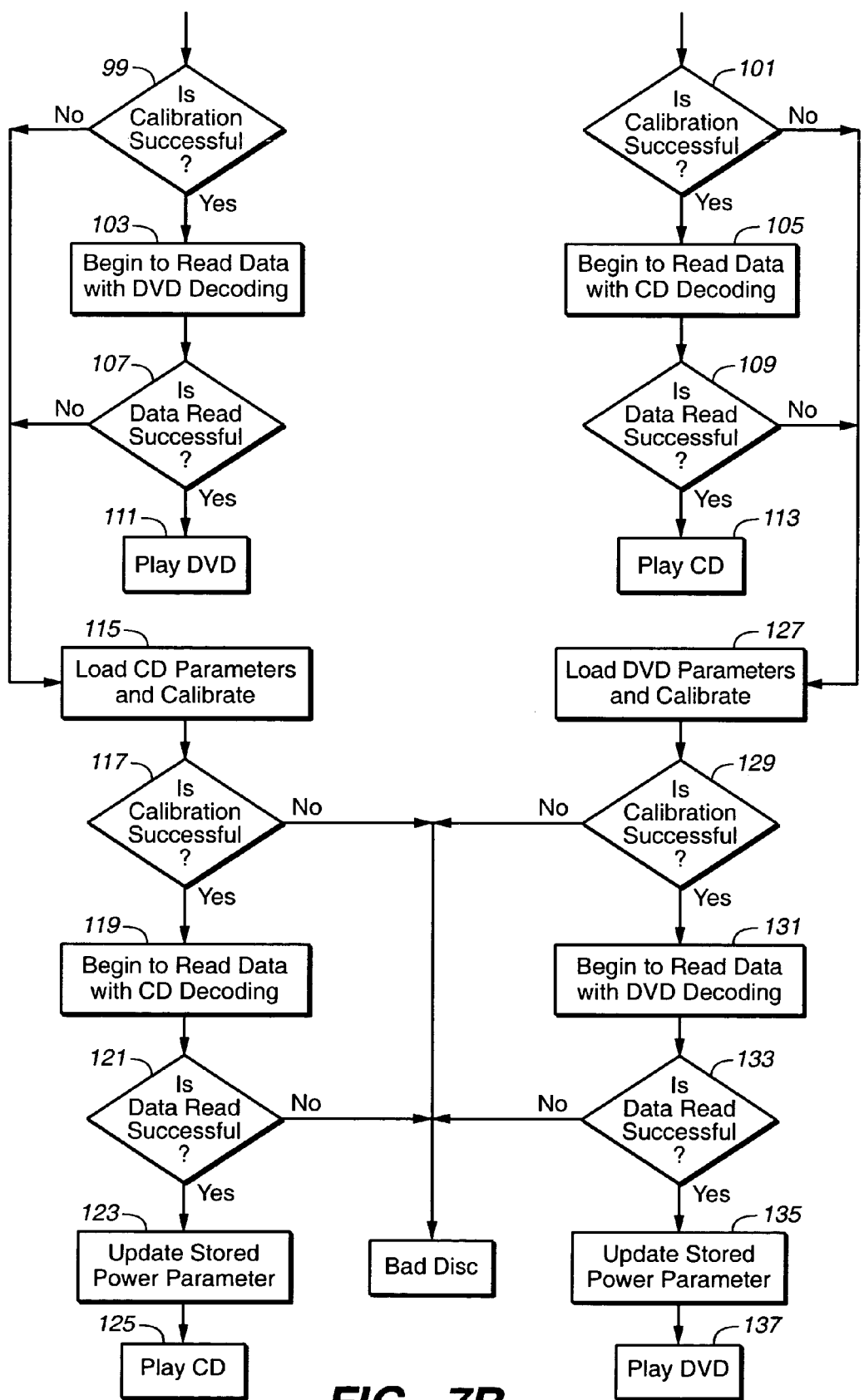
FIG._7B

TECHNIQUES FOR DETECTING A TYPE OF OPTICAL MEDIA AND OPERATING A MEDIA MACHINE IN RESPONSE

BACKGROUND

This invention relates generally to the operation of optical media player and recorder machines, such as those that operate with both compact disc (CD) and digital versatile disc (DVD) types, and, more specifically, to techniques for reliably identifying the type of disc that has been placed into such a machine.

After an optical data disc is placed into a player or recorder, one of the first operations automatically performed by the machine is to identify the type of the disc by its physical characteristics. A common identification technique measures the relative distance from a surface of the disc to a reflective layer within the disc where the data are stored. One way this is done is to move the focal point of the optical pick-up unit into the disc and measure the amount of time elapsed between photodetector output signals of reflections from the outer surface and then from the data layer within the disc. Different types of media have their data surfaces positioned at different distances from their outer surfaces. This surface in CDs is nominally twice the distance from an outside surface as in DVDs, for example.

This initial disc identification is necessary for the machine to next configure and calibrate itself to operate with that particular type of disc. Differences between types of discs include the data track spacing, the position of the data containing layer within the disc, the physical format of the data stored on the disc tracks, the protocol of the stored data, and the like. If the disc is improperly identified, an initial attempt to complete a calibration phase or read the data may fail. The machine then usually either repeats the identification process, or tries to configure itself to operate with some other type of disc, or sometimes both. This process usually takes a significant amount of time, which is typically unacceptable to the user of a machine.

SUMMARY OF THE INVENTION

Once it is determined that a particular optical disc has been incorrectly identified, the machine adapts itself to perform the initial identification process in a different manner in order to correct the problem. Once the optical disc is correctly identified by the machine after an earlier incorrect identification, the reason for the error is learned and the process then corrected for use with subsequent discs.

One application of this concept is in optical media players and recorders that initially identify the disc by scanning an optical focus from an outer surface to an internal data carrying surface to measure a relative distance between the surfaces. The time of the scan between the two surfaces is usually measured and then compared to a set threshold time. In the most common machines that take both CDs and DVDs, an elapsed time less than the threshold identifies the disc as a DVD and a time greater than the threshold identifies the disc as a CD. But with the pressure in recent years to reduce the cost of these machines, the tolerances of the focal point drive mechanisms have increased so that the performance of the same type of mechanism in one machine is often different than in another machine, and/or operation of a single mechanism changes over time. This can cause a given machine to measure the elapsed times for CDs and DVDs to both be above or below the set threshold, one of which is necessarily incorrect. Therefore, according to the present invention, at least one parameter utilized in connection with this time measurement is altered in response to an incorrect measurement being made.

In a specific example described hereinafter, a parameter of the electrical drive actuating the mechanism carrying the focal point optics is changed in order to drive the focal point faster or slower, as necessary to correct the next identification of the same type of disc. This parameter is stored in a non-volatile memory of the machine along with its other operating parameters. As part of the correction process, this parameter is updated so that the new parameter value, be it voltage, current, pulse rate or some other quantity, controls the scanning during the next disc identification.

As an alternative to changing the speed of the focal point mechanism, its scan speed may stay the same and the threshold value changed to lie between the elapsed times obtained for a CD and a DVD with that speed.

Additional aspects, advantages and features of the present invention are included in the following description of exemplary examples thereof, which description should be taken in conjunction with the accompanying drawings.

BRIEF DESCRIPTION OF THE DRAWINGS

FIG. 1 schematically shows those portions of a compact disc player or recorder relevant to the present invention;

FIG. 2 shows an optical focal point being scanned between a surface and an interior data-containing layer of a DVD;

FIG. 3 shows an optical focal point being scanned between a surface and an interior data-containing layer of a CD;

FIG. 4 is a curve illustrating the response of the photodetector of FIG. 1 to the scanning shown in FIG. 2;

FIG. 5 is a curve illustrating the response of the photodetector of FIG. 1 to the scanning shown in FIG. 3;

FIG. 6 includes several curves that illustrate ranges of operation of the machine of FIG. 1 that are shown in FIGS. 2-5; and FIG. 7 is a flowchart illustrating a specific operation of the machine of FIG. 1 to operate in the manner shown in FIGS. 2-5.

DETAILED DESCRIPTION OF EXEMPLARY EMBODIMENTS

The example implementations of the invention are described with respect to the identification of CDs and DVDs in an optical disc player and/or recorder. The techniques described in that context are also applicable to distinguishing between other types of optical media. There are several types of CDs, namely CD-ROMs, CD-R and CD-RW, and several types of DVDs, including DVD-ROMs (single and dual layer), DVD+R/–R (single and dual layer) and DVD+RW/–RW. A CD of any type may be distinguished from a DVD of any type by the techniques described herein. Although the present invention can also be used to further ascertain the type of CD or type of DVD, present machines typically make this identification, where necessary, by other methods.

Referring to FIG. 1, an optical disc 11 is removably carried by a spindle turntable 13 of a player and/or recorder. The spindle 13, and thus also the optical disc 11, is rotated by an electrical motor 15. An optical pick-up unit (OPU) 17 is carried by a radial arm (not shown) that allows reading across the entire disc radius. Within the OPU 17 are electrical motors, actuators or other motive sources 19 and 21, having a limited mechanical displacement capability, that are attached to an optical element 23 to move it axially (toward and away from the disc 11) and radially (parallel with the disc 11), respectively. Actuation of the optical element is required to maintain the focal point on the data layer and to follow the spiral data track. Although only a single lens 23 is shown, the optical system can include multiple optical elements or a different type of element.

Two laser diodes 25 of different wavelengths in the visible or near-visible portions of the electromagnetic spectrum, one for CDs and the other for DVDs, emit a monochromatic beam 27 of optical radiation at one of the two wavelengths at a time. The collimated beam 27 is passed through a beam splitter 29 and the objective lens 23 to a focal point 31. That radiation is reflected back through the beam splitter onto a photodetector 33. The photodetector 33 may be a suitable one of many different types available but most commonly includes four independent photodetectors A, B, C and D positioned in individual geometric quadrants, as shown. The outputs of all four photodetectors are carried by an electronic circuit 35 to a control and signal processing circuits 37. These outputs may be combined in different ways by the circuit 37. Since a data track within the disc 11 typically moves both radially and axially while the disc is being rotated due to disc and/or turntable mechanical imperfections, suitable closed focus and tracking loops, including the circuits 37, cause the motive sources 19 and 21 to move the lens 23 to minimize an error signal generated by a particular combination of the four photodetectors 33. The control and processing circuits 37 includes analog-to-digital (A/D) circuits 39 that convert the analog photodetector outputs into digital signals that are then utilized by a microprocessor 41 and other portions of the circuits 37.

The machine of FIG. 1 also includes circuits 43 that drive the motor 15 and the motive sources 19 and 21. The control and signal processing circuits 37 include digital-to-analog (DAC) converters 45 that provide analog signal outputs that control the motor drivers 43. These drivers most commonly apply power to each of the motive sources 19 and 21 with voltage values controlled by respective ones of two of the signal outputs of the DACs 45. These voltages control the manner in which these motive sources 19 and 21 independently move the lens 23 in the respective two orthogonal directions.

Connected with the circuits 37 is a user interface 47 that includes buttons, switches and the like that the user manipulates to operate the machine, and indicators that provide the user with status information of the machine. Further, a digital memory 49 is also connected with the control and signal processing circuits 37. The memory 49 preferably includes both re-programmable non-volatile semiconductor memory, such as flash memory, and volatile dynamic random-access memory (DRAM). A set of temporary data storage registers 51 are also provided within the circuits 37. The control and signal processing circuits 37 may be implemented on a single integrated circuit chip, with the memory 49 provided by one or more additional chips.

FIGS. 2 and 3 illustrate a physical difference between CDs and DVDs. A DVD 11d (FIG. 2) has a partially reflective front or bottom surface 53 and a reflective data-carrying layer 55 positioned a distance $d_{DVD}$ from the surface 53. Movement of the lens 23 the distance $d_{DVD}$ causes the focal point 31 to move between the two surfaces 53 and 55 of the DVD 11d, as shown. Similarly, a CD 11c (FIG. 3) has a partially reflective front or bottom surface 57 and a reflective data-carrying layer 59 positioned a distance $d_{CD}$ from the surface 57. Movement of the lens 23 the distance $d_{CD}$ causes the focal point 31 to move between the two surfaces 57 and 59 of the CD 11c. The distance $d_{DVD}$ is about one-half the distance $d_{CD}$ in current CD and DVD products.

During the initial identification of the type of disc 11 that has been placed in the machine, electrical outputs of the four photodetectors 33 are added together by the control and signal processing circuits 37. The lens 23 is moved by the motive source 19 in order to move the focal point 31 between the outer surface of the disc and its inner reflective data surface, as best illustrated by FIGS. 2 and 3. FIGS. 4 and 5 are curves illustrating the combined output of the photodetectors 33 as a function of the time during when the focal point 31 scans a disc between these surfaces. In FIG. 4, scanning of the DVD 11d of FIG. 2 typically causes a sharp increase 61 when the focal point 31 is coincident with the outer surface 53, at time $t_S$, and a sharper increase 63 when coincident with the data-carrying surface 55, at time $t_{DVD}$ later. Similarly, in FIG. 5, scanning of the CD 11c of FIG. 3 typically causes a sharp increase 65 when the focal point 31 is coincident with the outer surface 57, at time $t_S$, and a sharper increase 67 when coincident with the data-carrying surface 59, at time $t_{CD}$ later. In this specific example, the lens 23 is moved at the same constant velocity between the extreme positions shown in each of FIGS. 2 and 3.

The time $t_{DVD}$ or $t_{CD}$ is measured during the respective initialization of a DVD or CD. The measured time is then compared with a predetermined threshold time t* that is stored in the non-volatile memory portion of the memory 49. In the case of FIG. 4, the time elapsed between the pulses 61 and 63 is less than t*, thereby indicating that the disc 11 is a DVD. Similarly, in the case of FIG. 5, the time elapsed between the pulses 65 and 67 is greater than t*, thereby indicating that the disc 11 is a CD. The comparison of the elapsed time between strong reflective pulses with the single threshold t* therefore provides the identification of the type of disc that has been placed into the machine. The control and signal processing circuits 37 may include a digital timer that begins counting upon receipt of the first pulse and stops counting when the second pulse is received. The elapsed time measured by the counter is then compared with the threshold t*, which is most conveniently read from the memory 49 into one of the registers 51 for use during the disc identification process.

The disc identification technique described with respect to FIGS. 2-5 works very well when the motive source 19 (FIG. 1) moves the lens 23 with a known velocity profile, preferably a constant velocity. But this velocity is not carefully controlled in low priced disc players and recorders. Wide tolerances of the lens moving mechanism (electrical and mechanical) result in significant differences between the speed with which the lens 23 moves in different copies of the same machine. This can result, for example, with reference to FIG. 4, in the time $t_{DVD}$ exceeding the threshold t* when the lens moves slower than that for which the threshold t* was set. A DVD disc is then erroneously identified as a CD disc. Similarly, if the lens moves significantly faster than anticipated, with reference to FIG. 5, the time $t_{CD}$ can be less than the threshold t* and misidentify the CD disc as a DVD disc. In order to keep the cost of the machines low, no servo loop that would allow control of the lens movement is provided.

Therefore, the present invention contemplates allowing the machine to learn from a mistaken disc identification in order to adjust the way future disc identifications are made, and thereby eliminate the mistake. In one embodiment, the level of voltage, current, pulse rate or some other aspect of electrical power driving the motive source 19 from the driver 43 is varied, depending upon the nature of the motive source 19. This may be accomplished by storing a parameter of the driving power within the non-volatile portion of the memory 49, which is read into one of the registers 51 prior to the identification process beginning. The driver circuits 43 are then caused by the controller and signal processing circuits 37 to drive the motive source 19 with a power level according to the stored parameter.

When a disc is incorrectly identified, this parameter is updated so that the motive source 19 moves the lens 23 at a different speed during the next disc identification. If a DVD disc is misidentified as a CD disc, for example, by the lens 23 being moved too slowly (the time $t_{DVD}$ of FIG. 4 being greater than the threshold t*), the parameter is changed so that the lens moves faster during the next identification. Similarly, if a CD disc is misidentified as a DVD disc by the lens 23 being moved too fast (the time $t_{CD}$ of FIG. 5 being less than the threshold t*), the parameter is changed so that the lens moves slower during the next identification.

If the machine has sufficient computational capability, which is the usual case, the parameter correction is made in one step. The amount of time taken to scan the focal point between the front and data containing surfaces (whose distance is known for an assumed medium) is used to calculate the actual velocity of the actuator. With the calculated actuator velocity and the supplied command parameter, the actuator transfer function is then derived. The corrected new command parameter is then calculated, using the nominal required velocity and the actuator transfer function. The new command parameter will cause the particular mechanism to thereafter scan the focal point between the front and data containing surfaces in the nominal desired time. If the machine does not have enough computational power, the parameter may be iteratively changed by a sequence of selected small increments. This improves the chances that the same type of disc will be correctly identified the next time, depending upon the amount of change made to the parameter. Relatively small steps are preferred in order not to drive the speed of the lens 23 too far in the other direction and result in misidentifying the other type of disc. If the same type of disc is incorrectly identified again, after the parameter has been updated once, it is updated again, and so on, until no errors in disc identification remain.

The error in the initial disc identification is discovered when the machine then attempts to configure, calibrate or read data according to the identified disc type. When the machine does not operate properly as a result, it then tries to operate according another standard disc type and, when this is successful, provides information of the misidentification that allows the driving power parameter to be updated in the correct direction. If a disc is identified as a DVD but turns out to be a CD, for example, the parameter is updated in a manner that reduces the speed of movement of the lens 23. Similarly, if a disc is identified as a CD but turns out to be a DVD the parameter is updated in a manner that increases the lens speed. The errors can occur because of differences among various machines caused by loose tolerances of their low cost components, or in a single machine after a period of use as the speed of the lens movement changes. In either case, automatic adjustment is provided to correct the situation.

Rather than change the drive of the motive source 19 to maintain the speed of the lens 23 about the same between different machines and in a single machine over time, the learning from disc misidentification can be used to adjust the threshold t*. When a disc identification error occurs, both of the times $t_{DVD}$ (FIG. 4) and $t_{CD}$ (FIG. 5) are both on one side of the threshold t* or the other. Therefore, in this alternative, the threshold t* is updated in response to an occurrence of this condition to move back in between these measured times.

The curves of FIG. 6 illustrate the error correction aspects of the present invention in a different way. The distances $d_{DVD}$ and $d_{CD}$ are fixed for the two types of discs DVD and CD being used as examples. The respective times $t_{DVD}$ and $t_{CD}$ that are measured to elapse as the lens focal point 31 (FIGS. 1-3) moves between reflective layers of the disc depend upon the speed at which the lens 23 is driven by the motive source 19. The three curves of FIG. 6 show this relationship for three different lens movement speeds. A curve 71 represents a "nominal" speed that is desired. The threshold t* is in between the times $t_{DVD}$ and $t_{CD}$ when the lens 23 moves at that speed. But if the lens moves faster or slower than this, the times $t_{DVD}$ and $t_{CD}$ shift together to the right or left along the time axis of FIG. 6, respectively.

A curve 73 shows a faster speed that is a limit of how fast the lens 23 may move and still correctly identify the disc. At this speed, the time $t_{CD}$ is coincident on the time axis with the fixed threshold time t*. The lens speed needs to be slightly less than that of the curve 73 in order to still correctly identify the disc. When the lens speed is that represented by the curve 73 or higher, a CD disc will be incorrectly identified as a DVD disc. This is corrected by either reducing the speed of the lens 23 by updating the parameter for driving the motive source 19 and leaving the threshold t* the same, or by shifting the threshold t* to the left along the time axis of FIG. 6 to again be in between the measured times $t_{DVD}$ and $t_{CD}$.

Another curve 75 illustrates a limit of how slow the lens 23 may be moved without incorrectly identifying a DVD disc as a CD disc. When the speed is that of the curve 75 or slower, the erroneous disc identification is corrected by either increasing the speed or moving the threshold t* to the right along the time axis of FIG. 6. A range of operation that results in correct disc identifications when the fixed threshold t* is used, is in between the curves 73 and 75. When outside of that range, the drive to the motive source 19 (FIG. 1) is changed to bring the speed of movement of the lens 23 back within that range and, if the updated parameter is calculated, back to the nominal speed 71.

The space between the curves 71 and 73 and the space between the curves 71 and 75 are set to accommodate a normal range of machine component tolerances. A basic limitation of about plus or minus 3 dB tolerance is maintained. This follows directly from the fact that nominally, $d_{CD}/d_{DVD}=2$. Only when the components exceed this range is correction required.

Referring to FIG. 7, an operational flowchart for the machine of FIG. 1 shows an example process of adjusting the speed of the lens in the manner described above when playing a disc. The disc identification process is commenced by the machine requesting at the system level that a preliminary identification be made, as indicated by a first step 81. Next, in a step 83, the motive source 19 is energized by the motor driver circuits 43 to move the focal point 31 of the lens 23 from a rest position a distance away from the disc surface toward the disc. The stored parameter is used by the controller and signal processing circuits 37 to control the amount of power provided by the motor driver 43 to the motive source 19, and thereby set the speed of movement of the lens 23 and its focal point 31. Prior to the step 83, the lens 23 will usually be moved away from the disc 11 so that its focal point 31 starts from a position a distance in front of the disc.

As indicated by a step 85, the combined output signal 35 of the photodetectors 33 is monitored by the circuits 37 until a spike in the reflection is detected (one of the spikes 61 or 65 of FIGS. 4 and 5, for example). When detected, a timer within the circuits 37 is started, a step 87. In a next step 89, the circuits 37 again monitor the signal 35 for another spike in the reflected radiation (one of the spikes 63 or 67 of FIGS. 4 and 5, for example). When that occurs, in a step 91, the timer is stopped and its value read. This value is proportional to the distance between the outer surface of the disc that provides the first spike and the inner reflective surface that provides the second spike.

This timer value is then, in a step 93 of FIG. 7, compared with the threshold time t*. If less, the disc is identified as a DVD, and, if greater, as a CD. Once the disc is identified, the parameters of the machine for operation with the identified disc are read from the non-volatile portion of the memory 49 and the machine calibrated with those parameters. This is shown in a step 95 for a DVD and a step 97 for a CD. If the OPU 17 (FIG. 1) properly tracks the disc, as determined by a step 99 for a DVD and a step 101 for a CD, the machine then commences to read data from the disc according to either the DVD (a step 103) or CD (a step 105) formats. If the data are read successfully in this manner, as determined by respective steps 107 and 109, the disc is then played in full, by a step 111 (for a DVD) and 113 (for a CD).

But when either of the steps 99 or 107 is unsuccessfully completed to operate with a DVD, or the steps 101 or 109 for a CD, this indicates that the initial disc identification made in the step 93 was in error. A process then takes place to correctly identify and play the disc, and then to update the lens speed controlling parameter to correct the initial identification of the same type of disc the next time.

When a DVD has been misidentified, a next step 115 loads parameters for a CD in place of those previously loaded for a DVD, and calibrates the machine to play a CD. If that is successful, as indicated by a step 117, the reading of data is commenced by a step 119 according to a CD protocol. A step 121 determines whether the data can be read in such a manner. If so, the CD is played, as indicated by a step 125. Either before the disc is played or while it is playing, the parameter that controls the power applied to the motive source 19 is updated in a manner that causes the lens 23 to be moved faster. The next disc inserted into the machine will thereby be identified by moving the lens 23 and its focal point 31 at a higher speed.

If either of the steps 117 or 121 is unsuccessful, the attempt to read the disc is aborted. Both of the DVD and CD types accommodated by the machine have unsuccessfully been tried by this time. As an alternative to aborting the process, a part or all of it could be repeated in case the errors are the result of some one-time cause. Further, if the machine operates with more than two types of discs that are initially identified in this manner, the process will proceed after the steps 117 and 121 to try to calibrate and read the third type of disc.

In the same manner, if either of the steps 101 or 109 of the attempt to use an identified CD fails, the machine attempts to calibrate and play the disc as a DVD, in steps 127-133. If this is successful, the disc is played as a DVD, in a step 137, and the lens speed controlling parameter is updated in a step 135 during or before such play. This parameter is updated in a manner to drive the motive source 19 slower when the next disc is being identified.

Whether a DVD disc contains a single data surface or two data surfaces may optionally be determined by an extension of the technique. After the focal point 31 (FIG. 1) has reached the first data surface 55 (FIG. 2), the lens 23 is moved further toward the disc a distance sufficient to move the focal point 31 past a position where a second data surface would exist if present in the disc. If a peak reflected radiation intensity is detected at an expected time after the peak 63 (FIG. 4) from the first layer, then it is known that the disc has a second data containing surface. The time between the two pulses reflected from the two data containing layers is also adjusted as a result of the process described above.

Certain types of DVDs and CDs may also be identified by measuring the intensity of the reflected radiation pulses 63 (FIG. 4, for a DVD) and 67 (FIG. 5, for a CD). In a DVD, for example, the data containing surfaces of the DVD-ROM and DVD+R/-R are measurably more reflective than that of a DVD+RW/-RW. Similarly, the CD-ROM and CD-R discs are more reflective than the CD-RW disc. To make this additional identification on a particular disc, the peak output of the photo-detector from the reflected radiation pulse 63 or 67 is preferably compared with a threshold level I*. If above I*, the disc is identified to be the more reflective type, and, if below I*, the less reflective type.

The amount of reflection from a disc's data containing surface also depends upon the output level of the lasers 25 (FIG. 1), the cleanliness of the lens 23, and possibly on other factors. Therefore, it is preferable to be able to adapt the threshold I* in the individual machines to their specific laser and optical characteristics. The threshold I* of a particular machine, preferably stored in a non-volatile portion of the memory 49, can be updated in response to an erroneous determination having been made. The error is discovered when an attempt is made to calibrate the machine to read the disc or actually read data from the disc. The threshold I* is then updated by a relatively small step in a direction to overcome the error. If an error is again made during another disc identification by the same machine, the threshold I* is again updated. It may take only one or two updates to reach an optimum threshold I* for the machine, or could require further updates until no more identification errors are experienced.

Although the various aspects of the present invention have been described with respect to exemplary embodiments thereof, it will be understood that the present invention is entitled to protection within the full scope of the appended claims.

The invention claimed is:

1. A method of operating an optical disc machine having an optical disc removably positioned therein, comprising:
   identifying the optical disc positioned within the machine as one of at least two types of optical discs by optically measuring a physical characteristic of said optical disc according to parameters individually stored in the machine corresponding to at least two types,
   initializing operation of the machine for the identified type of optical disc, and
   if the initialized machine cannot thereafter read data from the optical disc positioned therein, initializing operation of the machine for one of at least two types of optial discs other than the identified type and, if the machine then reads data from the optical disc, updating the parameter in a manner that allows the machine to thereafter correctly identify the type of optical disc positioned within the machine.

2. The method of claim 1, wherein the parameter is a value of electrical energy applied to a mechanism that measures the physical characteristic.

3. The method of claim 2, wherein optically measuring the physical characteristic includes moving at least one optical element with respect to the optical disc positioned within the machine.

4. The method of claim 3, wherein the electrical energy applied to the measuring mechanism is applied to an electrical motive source that drives movement of said at least one optical element.

5. The method of claim 1, wherein the parameter is a threshold against which the measured physical characteristic is compared.

6. A method of operating an optical media machine having an optical medium removably positioned therein, wherein the optical medium is one of at least a first or a second type, the first type having a first data containing reflective layer a first distance from an outer surface of the medium, and the second type having a second data containing reflective layer a second distance from an outer surface of the medium, comprising:

illuminating the optical medium with optical radiation through optics driven by an electrical motive source to move a focal point of the optics at least between the outer surface and the data containing reflective layer, driving the electrical motive source with a value of electrical energy controlled by at least one command parameter stored in a non-volatile memory within the machine, monitoring a level of optical radiation that is reflected from the optical medium while the focal point of the optics is moved, thereby detecting when the optical focal point is coincident with the outer surface of the optical medium and when coincident with the data containing reflective layer therein, measuring an amount of time elapsed during movement of the optical focal point between the outer surface and the data containing reflective layer of the optical medium, identifying the optical medium in the machine among the first or second types as a result of the measured elapsed time being respectively greater or less than a specified threshold time, commencing to read data from the data containing reflective layer of the optical medium by operating the machine according to characteristics of the identified first or second type of optical medium, and thereafter, (a) if the machine operates satisfactorily to read data from the data containing reflective layer of the optical medium, continue to read the data according to characteristics of the identified type of optical medium, or (b) if the machine does not operate satisfactorily to read data from the data containing reflective layer of the optical medium, commencing to read the data by operating the machine according to characteristics of the other of the first and second types than that identified, and, if successful, reading the data from the data containing reflective layer of the optical medium according to characteristics of the other of the first and second types, and updating the parameter stored in non-volatile memory, thereby to change the amount of elapsed time measured during a subsequent occurrence of positioning another optical medium in the machine.

7. The method of claim 6, wherein the optical medium of the first type is a Compact Disc (CD), and the optical medium of the second type is a Digital Versatile Disc (DVD).

8. The method of claim 6, wherein monitoring a level of optical radiation that is reflected from the optical medium while the focal point of the optics is moved includes first detecting when the optical focal point is coincident with the outer surface of the optical medium and thereafter detecting when the optical focal point is coincident with the data containing reflective layer therein.

9. An optical disc machine, comprising:

a mechanism that rotates an optical disc, an optical pick-up unit illuminating the disc with the optical radiation detecting the optical radation reflected therein;

a re-programmable non-volatile memory storing parameters identifying different types of discs and operational characteristics for reading data from the disc in a manner dependent upon the type of disc being read, and a controller responsive to a level of the detected optical radiation reflected from the optical disc and using the parameters stored in the non-volatile memory for identifying the optical disc as one of at least two types and commencing to read data from the disc by use of the characteristics stored in the non-volatile memory for the identified type of disc, the controller further operating to automatically, in response to a failure to read data from the disc by use of the stored characteristics for the identified type of disc, reading data from the disc by use of the stored characteristics for a type of disc other than the identified type and, in response to said reading data from the disc with the other stored characteristics, updating the parameter stored for the identified type of disc.

10. The machine of claim 9, wherein the stored parameters arc different elapsed times of movement of a component of the optical pick-up unit with respect to the disc in order to detect certain levels of optical radiation reflected from the disc.

11. The machine of claim 9, wherein the stored characteristics include characteristics of tracks on the disc that carry the data.

\* \* \* \* \*